(12) United States Patent
Cutter et al.

(10) Patent No.: US 9,075,583 B1
(45) Date of Patent: Jul. 7, 2015

(54) LAYOUT DESIGN FOR A MOBILE APPLICATION USING SELECTED GOVERNANCE, RISK MANAGEMENT AND COMPLIANCE RULES

(71) Applicant: EMC Corporation, Hopkinton, MA (US)

(72) Inventors: Patrice Cutter, Olathe, KS (US); Jeremy Stephens, Hopkinton, MA (US); Lee Langmack, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 87 days.

(21) Appl. No.: 13/838,948

(22) Filed: Mar. 15, 2013

(51) Int. Cl.
*G06F 9/44* (2006.01)

(52) U.S. Cl.
CPC .................................. *G06F 8/20* (2013.01)

(58) Field of Classification Search
USPC .......................................................... 717/104
See application file for complete search history.

(56) References Cited

U.S. PATENT DOCUMENTS

| | | | |
|---|---|---|---|
| 7,184,801 | B2 | 2/2007 | Farcasiu |
| 8,479,154 | B1 * | 7/2013 | Friedman ...................... 717/106 |
| 2006/0212543 | A1 * | 9/2006 | O'Farrell et al. ............ 709/219 |
| 2011/0145657 | A1 * | 6/2011 | Bishop et al. ................ 714/47.1 |
| 2012/0036494 | A1 * | 2/2012 | Gurumohan et al. ......... 717/106 |
| 2012/0145783 | A1 * | 6/2012 | Landau .......................... 235/382 |
| 2013/0073388 | A1 * | 3/2013 | Heath ........................ 705/14.53 |
| 2013/0152056 | A1 * | 6/2013 | Chang et al. .................. 717/131 |
| 2013/0239086 | A1 * | 9/2013 | Brendza et al. ............... 717/109 |
| 2014/0007222 | A1 * | 1/2014 | Qureshi et al. .................. 726/16 |
| 2014/0013451 | A1 * | 1/2014 | Kulka et al. ..................... 726/29 |
| 2014/0053126 | A1 * | 2/2014 | Watson et al. ................ 717/102 |

OTHER PUBLICATIONS

Tiggzi, "Tiggzi—Features," http://www.tiggzi.com/features, 2012, 4 pages.
iBuildApp, "iBuildApp—Create Android and iPhone App. Free, No Coding Required," http://www.ibuildapp.com/features/, 2011-2013, 3 pages.
IBM, "Native, Web or Hybrid Mobile-App Development," IBM Software, Thought Leadership White Paper, 2012, 12 pages.
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Meng An
*Assistant Examiner* — Zengpu Wei
(74) *Attorney, Agent, or Firm* — Ryan, Mason & Lewis, LLP

(57) ABSTRACT

A method comprises selecting a set of governance, risk management and compliance rules, designing a layout for a mobile application, customizing data sources and permissions for the mobile application based on the set of governance, risk management and compliance rules, and building the mobile application. The selecting, designing, customizing and building are performed by at least one processing device. The governance rules comprise a set of policies which define a structure by which a given entity is directed and managed. The risk management rules comprise a set of business processes and tolerances defining an unacceptable potential for loss for the set of business processes. The compliance rules comprise a set of procedures for conforming to the governance and risk management rules.

22 Claims, 2 Drawing Sheets

LAYOUT DESIGN FOR A MOBILE APPLICATION USING SELECTED GOVERNANCE, RISK MANAGEMENT AND COMPLIANCE RULES

FIELD

The present invention relates generally to application design, and more particularly to mobile application design.

BACKGROUND

As smartphones, tablets and other mobile devices and associated mobile operating systems have advanced in terms of functionality offered, capability, and adoption in the population at large, businesses and other entities seek to increase their mobile presence. Employees, customers and partners may require access to various business data, resources and applications on the go. As such, businesses and other entities seek to provide mobile applications and support for employees, customers, etc. This typically requires businesses and other entities to build mobile applications from scratch and distribute hard-coded applications to their employees, customers, etc.

SUMMARY

Illustrative embodiments of the present invention provide techniques for building mobile applications.

In one embodiment, a method comprises selecting a set of governance, risk management and compliance rules, designing a layout for a mobile application, customizing data sources and permissions for the mobile application based on the set of governance, risk management and compliance rules, and building the mobile application. The selecting, designing, customizing and building are performed by at least one processing device.

In another embodiment, an apparatus comprises a rule selection module, a layout design module, a data source and permissions customization module and a mobile application building module. The rule selection module is configured to select a set of governance, risk management and compliance rules. The layout design module is configured to design a layout for a mobile application. The data source and permissions customization module is configured to customize data sources and permissions for the mobile application based at least in part on the set of governance, risk management and compliance rules. The mobile application building module is configured to build the mobile application. The rule selection module, layout design module, data source and permissions customization module and mobile application building module are implemented using at least one processing device.

These and other features and advantages of embodiments of the present invention will become more readily apparent from the accompanying drawings and the following detailed description.

DETAILED DESCRIPTION

Figure 1:
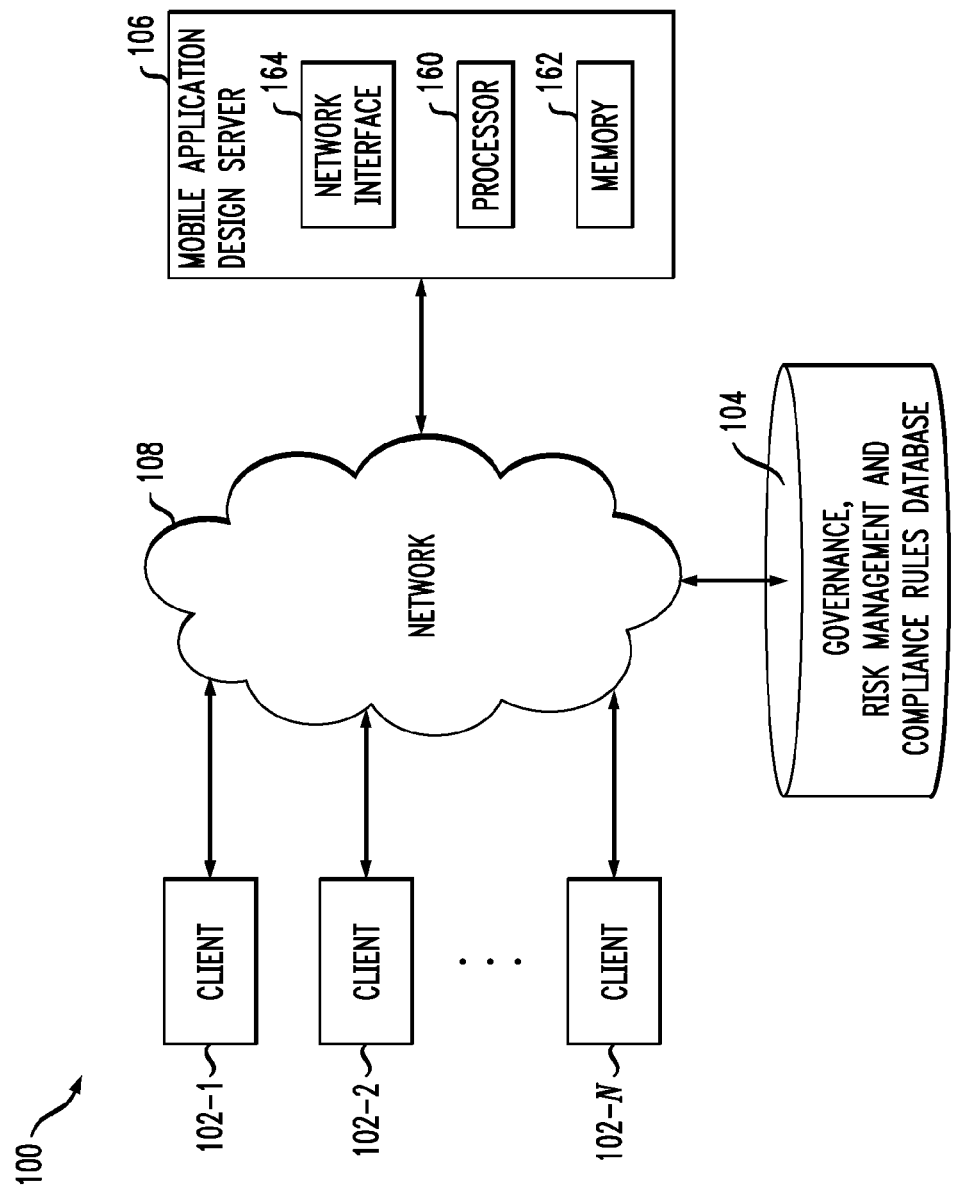
FIG. 1 is a block diagram of a communication system implementing mobile application design in an illustrative embodiment of the invention.

Illustrative embodiments of the present invention will be described herein with reference to exemplary communication systems, methods, servers and processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another over a network.

Businesses and other entities increasingly seek to offer mobile services and applications to employees, customers, partners, etc. Various users, however, may require access to different information and services. Developing hard-coded applications for each type of user can be costly and time-consuming for businesses and other entities, requiring such entities to write, develop and test code for numerous different applications. For example, at a given business, customer service employees may require access to information and resources very different from employees who work in product development or testing. In addition, managers and officers of a business or corporation may require access to information which generally is not or should not be provided to all employees of a business or corporation. Similarly, customers and partner entities and businesses may require access to still other information and resources.

Developing hard-coded applications for such a variety of users and use cases can be costly and difficult for entities, particularly in ensuring that such applications conform to the governance, risk management and compliance (GRC) standards for the organization.

Governance refers to information used to set the standards and guidelines for operating a given entity. Governance rules may comprise policies, laws or regulations which define a structure by which the entity is directed and managed. The policies may define the culture of the organization, its organizational hierarchy, goals, etc. Risk management refers to the process for ensuring that processes and behaviors of an entity remain within tolerances established by the entity. Risk management rules include information and constraints which ensure that correct controls are in place and functioning for an entity. Risk management rules may include a set of business processes and tolerances which define an unacceptable potential for loss for one or more business processes and practices. Compliance refers to the process of adhering to policies and decisions derived from the governance and risk management rules for an entity. Compliance rules may include a set of procedures for conforming to the governance and risk management rules for the entity. Compliance rules may also ensure adherence to laws, regulations, standards and agreements which govern the entity but are not defined by the entity.

In addition, many businesses and other organizations may have existing desktop or mobile applications. Converting and customizing such applications for particular employees, customers and partners in conformance with one or more sets of GRC rules represents additional challenges.

Accordingly, a need exists for systems and methods for designing mobile applications which conform to the GRC rules and standards for entities. Embodiments, of the invention provide systems, methods, and devices for designing mobile applications which meet these and other needs.

Embodiments of the invention may be used within processing platforms or entities which provide support services for the business-level management of enterprise GRC. For example, the RSA® Archer™ eGRC Platform is an example of a processing platform which allows businesses and other entities to build applications and integrate external systems. Embodiments of the invention may be used in conjunction with a suitably modified instance of the RSA™ Archer™ eGRC Platform to build mobile applications without requiring users to write code.

Embodiments of the invention can provide a flexible interface which allows for point-and-click or drag-and-drop interface design for mobile applications, such that users who are not software developers or otherwise trained in developing mobile applications can automate processes and workflows, control user access and reporting, etc. Embodiments of the invention may also utilize sets of GRC rules for a given entity to manage policies, risks, and processes across various divisions of the entity. Further, embodiments of the invention can permit users to collaborate by sharing mobile application design templates or sharing data between various divisions or departments of an entity and with other entities.

FIG. 1 shows a communication system 100 that incorporates mobile application design functionality in an illustrative embodiment. The system 100 comprises a plurality of clients 102-1, 102-2, . . . 102-N that are configured to communicate with a mobile application design server 106 over a network 108. The clients 102 and mobile application design server 106 are also configured to communicate with a GRC database 104.

The clients 102 and mobile application design server 106 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The mobile application design server 106 comprises a processor 160 coupled to a memory 162. The processor 160 may comprise a microprocessor, a microcontroller, an application-specific integrated circuit (ASIC), a field-programmable gate array (FPGA) or other type of processing circuitry, as well as portions or combinations of such circuitry elements. The memory 162 may comprise random access memory (RAM), read-only memory (ROM) or other types of memory, in any combination.

The memory 162 and other memories disclosed herein may be viewed as examples of what are more generally referred to as "computer program products" storing executable computer program code.

Also included in the mobile application design server 106 is network interface circuitry 164. The network interface circuitry 164 allows the mobile application design server 106 to communicate over the network 108 with the clients 102 and with the GRC database 104, and may comprise one or more conventional transceivers.

While not explicitly shown in FIG. 1, one or more of the clients 102 may similarly comprise a processor coupled to a memory, along with network interface circuitry.

The GRC database 104 may be embodied in a network attached storage device, a server or other processing device comprising one or more memories, a cloud computing storage server, etc. As will be described in further detail below, the GRC database may not be embodied in a physically separate device from the clients 102 and/or the mobile application design server 106. For example, the memory 162 of the mobile application design server may include the GRC database 104.

The clients 102, GRC database 104 and mobile application design server 106 may include additional components not specifically illustrated in this figure but of a type commonly used in communication systems, as will be appreciated by those skilled in the art.

The network 108 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

It is to be appreciated that the particular set of elements shown in FIG. 1 in system 100 is presented by way of example, and in other embodiments additional or alternative elements may be used. Thus, another embodiment may include additional networks, additional sets of clients, one or more additional mobile application design servers, one or more additional databases, etc.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 2:
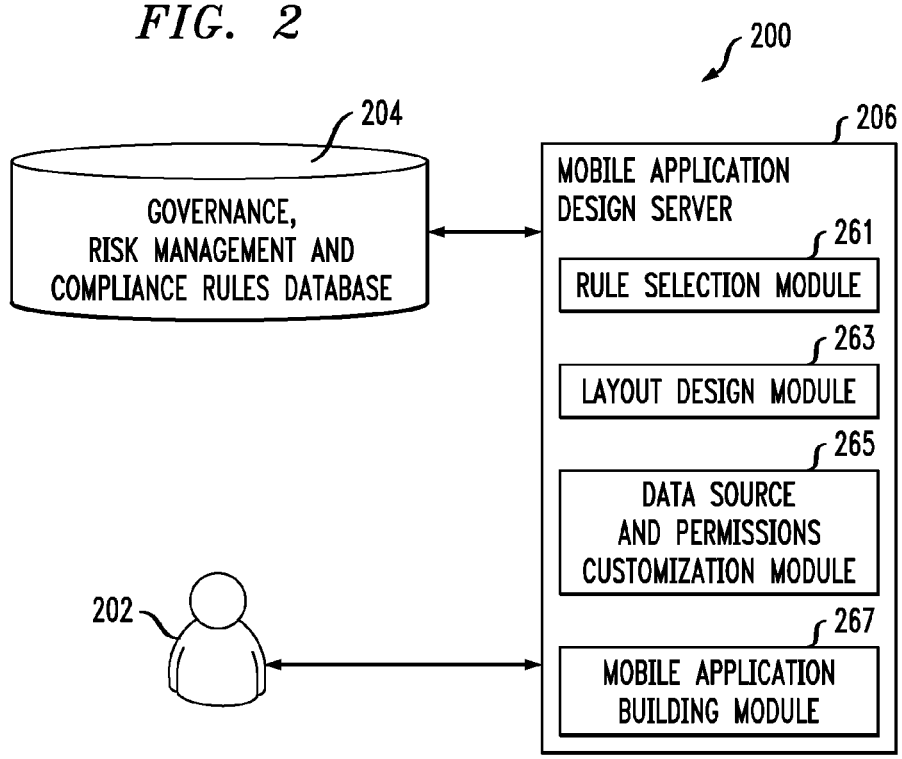
FIG. 2 illustrates an example of the communication system of FIG. 1 in an illustrative embodiment of the invention.

FIG. 2 shows an example of a communication system 200 corresponding generally to an implementation of communication system 100. FIG. 2 shows a user 202, which communicates with a mobile application design server 206 to build a mobile application. The mobile application design server 206 is configured to retrieve, store and modify information in a GRC database 204.

The mobile application design server 206 includes a rule selection module 261, a layout design module 263, a data source and permissions customization module 265 and a mobile application building module 267. These modules may be implemented using one or more processing devices comprising a processor coupled to a memory. The modules may also be implemented at least in part using software which is executed by one or more processing devices comprising a processor coupled to a memory.

The rule selection module 261, layout design module 263, data source and permissions customization module 265 and mobile application building module 267 may be configured to perform one or more functions which will be described in further detail below with respect to FIG. 3.

The user 202 in FIG. 2 may interface with the mobile application design server 206 and the GRC database 204 through one or more processing devices such as the clients 102 shown in FIG. 1. A given client 102 may comprise a desktop or portable personal computer, mobile telephone, personal digital assistant (PDA), wireless email device, workstation, kiosk, television set-top box, game console, or any other processing device including combinations of such devices.

It is to be appreciated that a given embodiment of the system 100 or the system 200 may include multiple instances of users, clients, GRC databases and mobile application design servers, and possibly other system components, although only single instances of illustrative examples of such components are shown in the simplified system diagrams of FIGS. 1 and 2 for clarity of illustration. Also, as indicated previously, other embodiments may combine certain system elements, such as the mobile application design server and the GRC database. It is also possible to eliminate, modify or replace other system elements.

Figure 3:
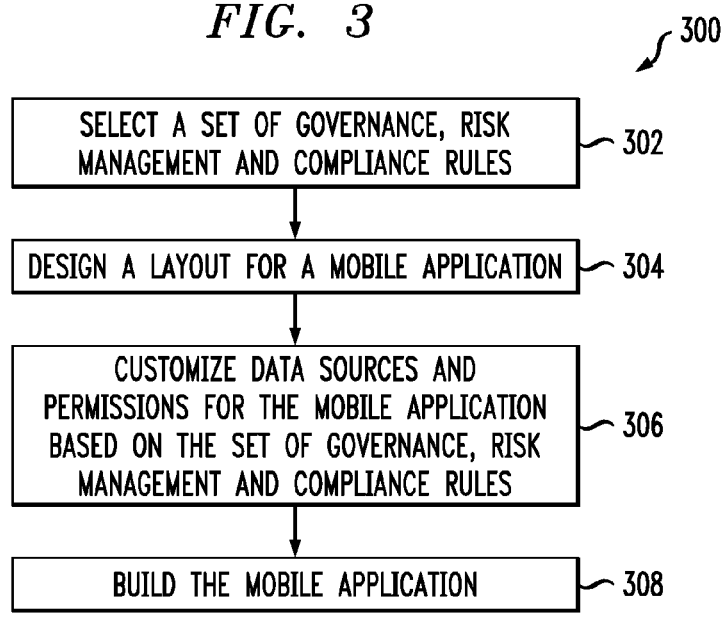
FIG. 3 illustrates a methodology for mobile application design, according to an illustrative embodiment of the invention.

FIG. 3 illustrates a methodology 300 for designing mobile applications in conformance with selected GRC rules. In some embodiments, the methodology 300 may be implemented via the mobile application design server 106 in conjunction with one or more other elements of the system 100 in FIG. 1 or the mobile application design server 206 in conjunction with one or more other elements of the system 200 in FIG. 2.

The methodology 300 begins with selecting 302 a set of GRC rules. The set of GRC rules may be manually selected by a user or client, or alternatively be determined based on one or more characteristics of a user or client seeking to build a mobile application. For example, the rule selection module 261 may be configured to determine an entity with which the user 202 is associated. The set of GRC rules may be selected based on this association. The selected set of GRC rules may be rules defined at least in part on the entity with which the user 202 is associated. In some embodiments, the user 202 may be an administrator of an entity or division designing a mobile application for employees, customers or partners associated with the entity division. The selected set of GRC rules may comprise GRC rules which govern the standards and procedures of how a given entity interacts with other entities or how two or more entities interact with one another.

The methodology 300 continues with designing 304 a layout for the mobile application. The layout design module 263 of the entitlements server 206 in FIG. 2 may be utilized to design the layout for the mobile application. As discussed above, embodiments of the invention may utilize a point-and-click or drag-and-drop interface permitting a user to easily design a layout without having to hard code the application. As a starting point, the design for an existing mobile application template or existing desktop application may be used. An entitlements server implementing the methodology 300 may store or retrieve information regarding existing desktop and mobile applications for a variety of entities and use these existing applications as templates for new applications.

Designing the layout of a mobile application may include customizing a variety of features of the mobile application. For example, designing the layout may include selecting entity-specific branding for the application. Such entity-specific branding may include an overall layout, color schemes, fonts, graphics, logos, etc. A user designing the mobile application may select entity-specific branding such that there is unified look and feel to desktop and mobile applications and to applications offered to employees, partners or customers of the entity.

In some embodiments, the layout of the mobile application may be designed by specifying the "drill down" capability and formatting for transitioning between summary information and detailed information in the mobile application. For example, a desktop application may have significantly expanded drill down information relative to a customized mobile application designed to correspond to the desktop application. Mobile applications are typically used on devices with smaller displays than that of desktop applications. For ease of use and clarity, it may be advantageous to limit the drill down information in the mobile application. Alternatively, the hierarchy of drill down information, and the transitions between summary and detailed information may be adjusted for the mobile application to account for such differences in typical mobile devices expected to run the application.

As discussed above, mobile applications are typically utilized on devices with smaller displays than that of desktop applications. Accordingly, the application layout may be designed and customized for particular screen sizes. For example, if an entity wishes to design a mobile application for its employees and the employees are provided with a specific mobile device such as a tablet or phone with a specific screen size, the mobile application may be customized for the specific screen size or other hardware capabilities of such mobile devices as will be discussed in further detail below.

Designing the layout of the mobile application may further include specifying particular tabs, pages, frames, etc. of the mobile application, and the particular content available on the tabs, pages and frames of the mobile application. As will be appreciated by one skilled in the art, various tabs, pages, frames etc. may be used for a particular application layout design based on the needs of a particular end-user or class of end-users expected to utilize the mobile application.

By way of example, such tabs may include a "recents" tab displaying a list of records recently viewed using the mobile application or a corresponding desktop application, a "favorites" tab displaying frequently used or bookmarked records of the mobile application or the corresponding desktop application, a "search" tab allowing an end-user to search the mobile application which displays predefined or default search criteria, a "dashboard" or "home" tab which displays a summary of records and other information in the mobile application, and a "settings" tab which allows an end-user of the mobile application to customize the mobile application. A given mobile application may also be designed to share information included in various tabs such as the recent or favorites tab with one or more other end-users running other copies of the mobile application or other corresponding desktop and mobile applications. A given mobile application may also share information among mobile and desktop applications that a given end-user runs on different devices. The status of information sharing or synchronization between end-users, between applications, and between a mobile application for an entity and a data source of the entity may be displayed in a "synchronization" tab.

The methodology 300 continues with customizing 306 data sources and permissions for the mobile application based on the selected set of GRC rules. The data source and permissions customization module 265 of the entitlements server 206 in FIG. 2 may be utilized to customize the data sources and permissions. The selected set of GRC rules may be used to determine which data sources are available for a given mobile application, as well as defining permissions for accessing such data sources and other features of the application. The permissions may include user-based permissions for accessing particular functions, features and information. The permissions may also include entity-based permissions which effect the selected set of compliance rules based on the selected set of governance and risk management rules.

The data sources and permissions may comprise various information and features which depend on a particular entity or particular expected end-users of the given application. By way of example, customizing the data sources and permissions may include defining specific data sets which are available on the application. Such data sets may relate to specific products, files, customers, accounts, etc. for a given entity. This customization can be advantageous for certain entities subject to particular compliance rules.

For example, laws and regulations which govern financial institutions often require certain information that must be presented or otherwise made available to potential customers in conjunction with offering specific financial products to the potential customers. A given mobile application may be designed to allow customers to view, purchase or trade such financial products. Customizing the data sources for such mobile applications may include ensuring that data sources including required product information are provided or otherwise made available via the mobile application in accordance with the selected set of compliance rules governing the entity.

The permissions may be customized based on an expected class of end-users for the mobile application. For example, end-users in a legal division may require access to different data sets than end-users in a human resources division or in a product development division of an entity. Mobile applications may be designed for each class of users, or a given mobile application may be designed for two or more classes of users, with the data sets and permissions being customized for each user class. Customizing data sources and permissions may also include selecting workflow tasks, functions, questionnaires, and other information which are provided in the mobile application.

Customizing data sources and permissions may further include selecting which data sets, features and other information is available in an offline viewing mode when a mobile device running the mobile application does not have a connection to the Internet and/or an entity's intranet. Embodiments of the invention may also customize data and other information which is pushed to the mobile application. The data sources and permissions can further specify reporting and visualization criteria, such as information and data which should be pushed to or pulled from a given application in accordance with the selected set of GRC rules.

The mobile application data sources and permissions may also be customized subject to the selected set of GRC rules with respect to the level of drill down information available. For example, different classes of users within a business or other entity may have access to different data sets or different detailed information than other users. For instance, executives and managers may have access to more or different detailed information than employees that they supervise. Alternatively, the data sources for a particular mobile application may be customized for a particular business partner of a given entity, and the drill down information available to the business partner may be different than drill down information available to the given entity or to other business partners.

As described above, the layout of the mobile application may be designed for a specific mobile device or class of mobile devices. Similarly, customizing the data sources and permissions for the application may involve leveraging or otherwise utilizing particular hardware features of the specific mobile device or class of mobile devices for which the mobile application is designed. By way of example, various mobile devices such as smartphones and tablets come equipped with front and rear facing cameras, positions sensors such as accelerometers, gyroscopes and global positioning system (GPS) sensors, etc. The data sources and permissions for a particular mobile application may be customized to take advantage of such features. For example, mobile applications may include specific permissions relating to video-conferencing features which are restricted to employees within a given entity or within a given division or branch of an entity, or with specific partners or customers of the entity.

As another example, a mobile application may be designed for a product development team at a given entity. For convenience, a mobile application may be developed for members of the product development team so that they can move around a given facility or between facilities, etc. to work with one another and other partners in developing the product. The GRC rules, however, may specify that the product development be kept secret for a variety of reasons. For example, the product may be developed for a particular partner who wants the details of the product to remain secret so as to gain a competitive edge in the marketplace. The product may also be developed in secret so as to maintain future patent or trade secret protection. To ensure compliance with the governance and risk management rules regarding the product, the mobile application may customize the permissions for particular data sources such that members of the product team may only access certain product information from mobile devices within a given geographic area. For example, the customized permissions may utilize position sensors such as a GPS sensor to specify that particular data sources relating to the product may only be accessed while a mobile device running the application is within a certain range of one or more facilities of the entity.

As will be appreciated by one skilled in the art, various other data sources and permissions may be defined and customized for a particular mobile application which utilize hardware specific to a mobile device or mobile devices expected to run the mobile application.

A given mobile application may implement authentication processes for allowing an end-user to sign in to an application and unlock specific data sources and features of the mobile application. Thus, customizing the data sources and permissions for a mobile application may include defining data sources and features restricted to particular users as defined in the selected set of GRC rules. In some embodiments, mobile applications may utilize existing hardware or software-based authenticators issued by an entity for unlocking or accessing data sources and features of a mobile application. By way of example, some embodiments may utilize authentication tokens such as the RSA SecurID® user authentication token, commercially available from RSA, The Security Division of EMC Corporation, of Bedford, Mass., U.S.A. for unlocking or accessing restricted data sources.

The methodology 300 continues with building 308 the mobile application. The mobile application building module 267 of the entitlements server 206 in FIG. 2 may be utilized to build the mobile application. Embodiments of the invention utilize the selected set of GRC rules, the layout design and the customized data sources and permissions to build custom mobile applications, or mobile application configurations used to provision or modify existing mobile applications, to meet the particular needs of an entity or specific individuals associated with an entity or entities. This provides significant advantages relative to conventional hard-coded mobile applications, which do not provide the flexibility and customization required for specific individuals associated with an entity and GRC standards and rules associated with the entity. Building the mobile application may also include testing the mobile application. The mobile application may be tested for compatibility with particular mobile device, or mobile operating systems using one or more simulation tools.

It is important to note that building the mobile application may involve building a new stand-alone mobile application, building an application or configuration for use within or in conjunction with another mobile application, or generating a mobile application configuration used to modify or provision an existing mobile application or mobile application template. The mobile application builder module 267 may be configured to build, modify or provision stand-alone mobile applications customized for a specific mobile operating system or a specific mobile device or class of mobile devices such as tablets or smartphones. In other embodiments, the mobile application builder module 267 may be configured to build web-based or cloud-based mobile application offerings.

The particular processing operations and other system functionality described in conjunction with the flow diagram of FIG. 3 is presented by way of illustrative example only, and should not be construed as limiting the scope of the invention in any way. Alternative embodiments can use other types of processing operations for building mobile applications. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different features and sources in a given mobile application.

It is to be appreciated that the methods and processing functionality such as that described in conjunction with the flow diagram of FIG. 3 and the associated examples above can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

It is to be appreciated that the particular configuration, elements and operating parameters of the embodiments described above are not requirements of the invention, and should not be construed as limiting the scope of the invention in any way. For example, while various embodiments of the invention described above refer to selecting a set of GRC rules specific to a given entity, GRC rules may be selected for two or more entities. A given mobile application may be designed and customized for two business partners, and thus the GRC rules for both business partners may be selected and the data sources and permissions in the application may be customized based on the selected rules for both business partners. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    selecting a set of rules comprising one or more governance rules, one or more risk management rules and one or more compliance rules, at least one of the compliance rules comprising one or more procedures for conforming to at least one of the governance and risk management rules;
    designing a layout for a mobile application;
    customizing data sources and permissions for the mobile application based on the set of governance, risk management and compliance rules; and
    building the mobile application using the designed layout and customized data sources and permissions;
    wherein the permissions for the mobile application comprise:
        one or more user-based permissions for accessing respective ones of the data sources using the mobile application; and
        one or more entity-based permissions which implement at least one of the procedures for conforming to the governance and risk management rules;
    wherein at least one of the one or more user-based permissions restricts access by the mobile application to one or more hardware components of a mobile device running the mobile application based on a class of a user of the mobile device, the one or more hardware components comprising at least one of a camera of the mobile device and a position sensor of the mobile device;
    wherein the set of governance, risk management and compliance rules is based at least in part on a given entity associated with the user of the mobile device running the mobile application;
    wherein at least one of the one or more entity-based permissions specifies procedures for interaction between the given entity and one or more other entities; and
    wherein the selecting, designing, customizing and building are performed by at least one processing device.

2. The method of claim 1, wherein the one or more governance rules comprise a set of policies which define a structure by which a given entity is directed and managed.

3. The method of claim 1, wherein the one or more risk management rules comprise a set of business processes and tolerances defining an unacceptable potential for loss for the set of business processes.

4. The method of claim 1, wherein designing the layout comprises selecting entity-specific branding for the mobile application, the entity-specific branding comprising logos and a color scheme.

5. The method of claim 1, wherein designing the layout comprises configuring a tab layout and content for tabs in the mobile application.

6. The method of claim 1, wherein designing the layout comprises utilizing a drag-and-drop designer.

7. The method of claim 1, wherein designing the layout comprises modifying an existing mobile application template.

8. The method of claim 1, wherein designing the layout comprises creating a new mobile application template.

9. The method of claim 1, wherein designing the layout comprises modifying an existing desktop or web application.

10. The method of claim 9, wherein customizing data sources and permissions comprises selecting one or more datasets, workflows and questionnaires in the existing desktop or web application to include in the mobile application.

11. The method of claim 1, wherein customizing the data sources and permissions comprises defining data pushed to the mobile device running the mobile application.

12. The method of claim 1, wherein customizing the data sources and permissions comprises defining one or more new data types which use the hardware components of the mobile device running the application.

13. The method of claim 12, wherein the hardware components comprise at least one of a front-facing camera a rear-facing camera, and the position sensor.

14. The method of claim 1 wherein the mobile application comprises one of a cloud-based mobile application and a web-based mobile application.

15. The method of claim 1, wherein customizing the data sources and permissions comprises restricting access to one or more data sources to one or more classes of users of the application.

16. The method of claim 15, wherein the one or more restricted data sources are accessed using a passcode provided by an authenticator comprising an authentication token.

17. A non-transitory processor-readable storage medium having instruction code embodied therein which when executed by a processing device causes the processing device:
to select a set of rules comprising one or more governance rules, one or more risk management rules and one or more compliance rules, at least one of the compliance rules comprising one or more procedures for conforming to at least one of the governance and risk management rules;
to design a layout for a mobile application;
to customize data sources and permissions for the mobile application based on the set of governance, risk management and compliance rules; and
to build the mobile application using the designed layout and customized data sources and permissions;
wherein the permissions for the mobile application comprise:
one or more user-based permissions for accessing respective ones of the data sources using the mobile application; and
one or more entity-based permissions which implement at least one of the procedures for conforming to the governance and risk management rules;
wherein at least one of the one or more user-based permissions restricts access by the mobile application to one or more hardware components of a mobile device running the mobile application based on a class of a user of the mobile device, the one or more hardware components comprising at least one of a camera of the mobile device and a position sensor of the mobile device;
wherein the set of governance, risk management and compliance rules is based at least in part on a given entity associated with the user of the mobile device running the mobile application; and
wherein at least one of the one or more entity-based permissions specifies procedures for interaction between the given entity and one or more other entities.

18. An apparatus having at least one processing device, said apparatus comprising:
a rule selection module configured to select a set of rules comprising one or more governance rules, one or more risk management rules and one or more compliance rules, at least one of the compliance rules comprising one or more procedures for conforming to at least one of the governance and risk management rules;
a layout design module configured to design a layout for a mobile application; a data source and permissions customization module configured to customize data sources and permissions for the mobile application based at least in part on the set of governance, risk management and compliance rules; and
a mobile application building module configured to build the mobile application using the designed layout and the customized data sources and permissions;
wherein the permissions for the mobile application comprise:
one or more user-based permissions for accessing respective ones of the data sources using the mobile application; and
one or more entity-based permissions which implement at least one of the procedures for conforming to the governance and risk management rules;
wherein at least one of the one or more user-based permissions restricts access by the mobile application to one or more hardware components of a mobile device running the mobile application based on a class of a user of the mobile device, the one or more hardware components comprising at least one of a camera of the mobile device and a position sensor of the mobile device;
wherein the set of governance, risk management and compliance rules is based at least in part on a given entity associated with the user of the mobile device running the mobile application;
wherein at least one of the one or more entity-based permissions specifies procedures for interaction between the given entity and one or more other entities; and
wherein the rule selection module, layout design module, data source and permissions customization module and mobile application building module are implemented using the at least one processing device.

19. The apparatus of claim 18, wherein the one or more governance rules comprise a set of policies which define a structure by which a given entity is directed and managed and wherein the one or more risk management rules comprise a set of business processes and tolerances defining an unacceptable potential for loss for the set of business processes.

20. The method of claim 1, wherein at least one of the user-based permissions for a given data source specifies a hierarchy of two or more levels of drill down information for the given data source and transitions between the two or more levels of drill down information for the given data source.

21. The method of claim 20, wherein the hierarchy of and transitions between the two or more levels of drill down information are based at least in part on the mobile device running the application.

22. The method of claim 20, wherein the hierarchy of and transitions between the two or more levels of drill down information are based at least in part on the class of the user of the mobile device running the mobile application.

* * * * *